(12) United States Patent
Davis et al.

(10) Patent No.: US 10,354,234 B2
(45) Date of Patent: Jul. 16, 2019

(54) SYSTEM AND METHOD FOR SINGLE POINT OF ENTRY DEPOSIT

(75) Inventors: Steven Davis, Ossining, NY (US); Martin Klamen, Teaneck, NJ (US)

(73) Assignee: EFT NETWORK, INC., Hawthorne, NY (US)

( * ) Notice: Subject to any disclaimer, the term of this patent is extended or adjusted under 35 U.S.C. 154(b) by 2501 days.

(21) Appl. No.: 10/811,093

(22) Filed: Mar. 26, 2004

(65) Prior Publication Data
US 2005/0216410 A1 Sep. 29, 2005

(51) Int. Cl.
G06Q 20/00 (2012.01)
G06Q 20/04 (2012.01)
G07F 7/04 (2006.01)

(52) U.S. Cl.
CPC ............ G06Q 20/042 (2013.01); G07F 7/04 (2013.01)

(58) Field of Classification Search
CPC .................................................... G06Q 40/00
USPC ...................................................... 705/45, 35
See application file for complete search history.

(56) References Cited

U.S. PATENT DOCUMENTS

| | | | |
|---|---|---|---|
| 4,358,671 A * | 11/1982 | Case | 235/379 |
| 5,754,673 A | 5/1998 | Brooks et al. | |
| 6,450,403 B1 | 9/2002 | Martens et al. | |
| 6,650,767 B2 | 11/2003 | Jones et al. | |
| 2001/0018739 A1 | 8/2001 | Anderson et al. | |
| 2002/0001393 A1 | 1/2002 | Jones et al. | |
| 2002/0065786 A1 | 5/2002 | Martens et al. | |
| 2002/0084321 A1 | 7/2002 | Martens et al. | |
| 2002/0145035 A1 | 10/2002 | Jones | |
| 2002/0152164 A1 | 10/2002 | Dutta et al. | |
| 2002/0152170 A1 | 10/2002 | Dutta et al. | |
| 2002/0188564 A1 | 12/2002 | Star | |
| 2003/0009420 A1 | 1/2003 | Jones | |
| 2003/0111529 A1 | 6/2003 | Templeton et al. | |

(Continued)

OTHER PUBLICATIONS

Author: Hollingsworth, Donald L. The many options of the paper check: What's your preference? Publication info: AFP Exchange 22.2: 50-53. Association for Financial Professionals. (Mar./Apr. 2002) (Year: 2002).*

(Continued)

*Primary Examiner* — Bruce I Ebersman
*Assistant Examiner* — John A Anderson
(74) *Attorney, Agent, or Firm* — W & C IP

(57) ABSTRACT

Described is a method and system for single point deposit of checks. First, a computer scans each of a plurality of checks to generate digitized images thereof, the plurality of checks including at least one of non-consumer checks and consumer checks. After scanning the checks, the computer generates a master file including a record for each check which includes the digitized image of the corresponding check and a data portion including data obtained from a MICR line of the corresponding check. Once the masterfile is created, it is sorted into first and second sub-files based on the digitized images and/or the data portions. The first sub-file includes only the non-consumer checks and the second sub-file includes the consumer checks. The records of the first sub-file are processed according to a non-consumer check procedure. The records of the second sub-file are processed according to a consumer check procedure or the non-consumer check procedure.

4 Claims, 9 Drawing Sheets

(56) References Cited

U.S. PATENT DOCUMENTS

| | | | |
|---|---|---|---|
| 2003/0158811 A1* | 8/2003 | Sanders | G06Q 20/00 |
| | | | 705/39 |
| 2003/0200174 A1 | 10/2003 | Star | |
| 2005/0108167 A1* | 5/2005 | Cordery et al. | 705/45 |
| 2005/0171899 A1* | 8/2005 | Dunn et al. | 705/39 |
| 2007/0029376 A1* | 2/2007 | Stoutenburg | G06Q 20/04 |
| | | | 235/379 |
| 2009/0182666 A1* | 7/2009 | Geer | 705/45 |

OTHER PUBLICATIONS

Net Deposit, Case Study: Zions Bancorporation at http://www.net-deposit.com/NDZionsCSfinal.pdf (last accessed Aug. 5, 2004) [2 sheets].

Net Deposit, Case Study: SYSCO at http://www.net-deposit.com/NDsysco.pdf (last accessed Aug. 5, 2004) [2 sheets].

Net Deposit, Product Overview at http://www.net-deposit.com/ND_ProductOverview.pdf (last accessed Aug. 5, 2004) [2 sheets].

Office Teller Webpage at http://www.officeteller.com (last accessed Nov. 18, 2003) [2 sheets].

\* cited by examiner

Step 204 of Fig. 2

Step 208 of Fig. 2

Step 210 of Fig. 2

SYSTEM AND METHOD FOR SINGLE POINT OF ENTRY DEPOSIT

BACKGROUND

U.S. Banking system allows processing of many types of electronic payments, including those made by consumer and non-consumer checks. The payments made with non-consumer checks have different processing procedures than those made with consumer checks. Thus, a creditor who receives both types of checks must manually sort the checks in order to separate the non-consumer checks from the consumer checks before they are processed.

Subsequently, the creditor must deposit the consumer checks in a different manner than the non-consumer checks. For example, the creditor may deposit the consumer checks by entering the corresponding transaction information (e.g., ABA No., account No., check No., etc.). However, the non-consumer checks must be deposited manually. There is a need for a single point of entry deposit system that would eliminate the need for a physical sorting of checks and allow creditors to deposit both types of checks electronically.

SUMMARY OF THE INVENTION

The present invention relates to a system and method for a single point of entry deposit for financial instruments (e.g., checks, etc.). Checks of all categories/types (e.g., consumer and non-consumer checks) may be scanned into a computer which then digitizes the checks into check records and stores the records in a masterfile. The computer then separates the records into a first subfile for non-consumer checks and a second subfile for consumer checks. The first subfile is then processed according to non-consumer check procedures. The second subfile may be processed according to consumer check procedures or the non-consumer check procedures.

In addition, a system for depositing checks may include a database storing information corresponding to debtors, a master file including a set of records for a plurality of checks received from the debtors. Each record corresponds to one of the checks and includes a digitized image of the corresponding check and data obtained from a MICR (Magnetic Ink Character Recognition) line of the corresponding check. Each record is categorized a non-consumer check or a consumer check based on the digitized image, the data and/or the information in the database. The first subfile includes a first subset of the records corresponding to checks categorized as non-consumer checks. The second subfile includes a second subset of the records corresponding to checks categorized as consumer checks.

Furthermore, a system includes an image capturing device configured to capture a digitized image of a check and a processor. The processor extracts data from the digitized image of the check and categorizes the check as one of a non-consumer check and a consumer check based on the digitized image and/or the extracted data. The processor stores the digitized image and the data in a first file when the check is categorized as a non-consumer check and in a second file when the check is categorized as a consumer check.

BRIEF DESCRIPTION OF THE DRAWINGS

The accompanying drawings are included to provide a further understanding of the invention and are incorporated into and constitute part of the specification, illustrate several embodiments of the invention and, together with the description, serve to explain examples of the present invention. In the drawings.

DETAILED DESCRIPTION

Figure 1:
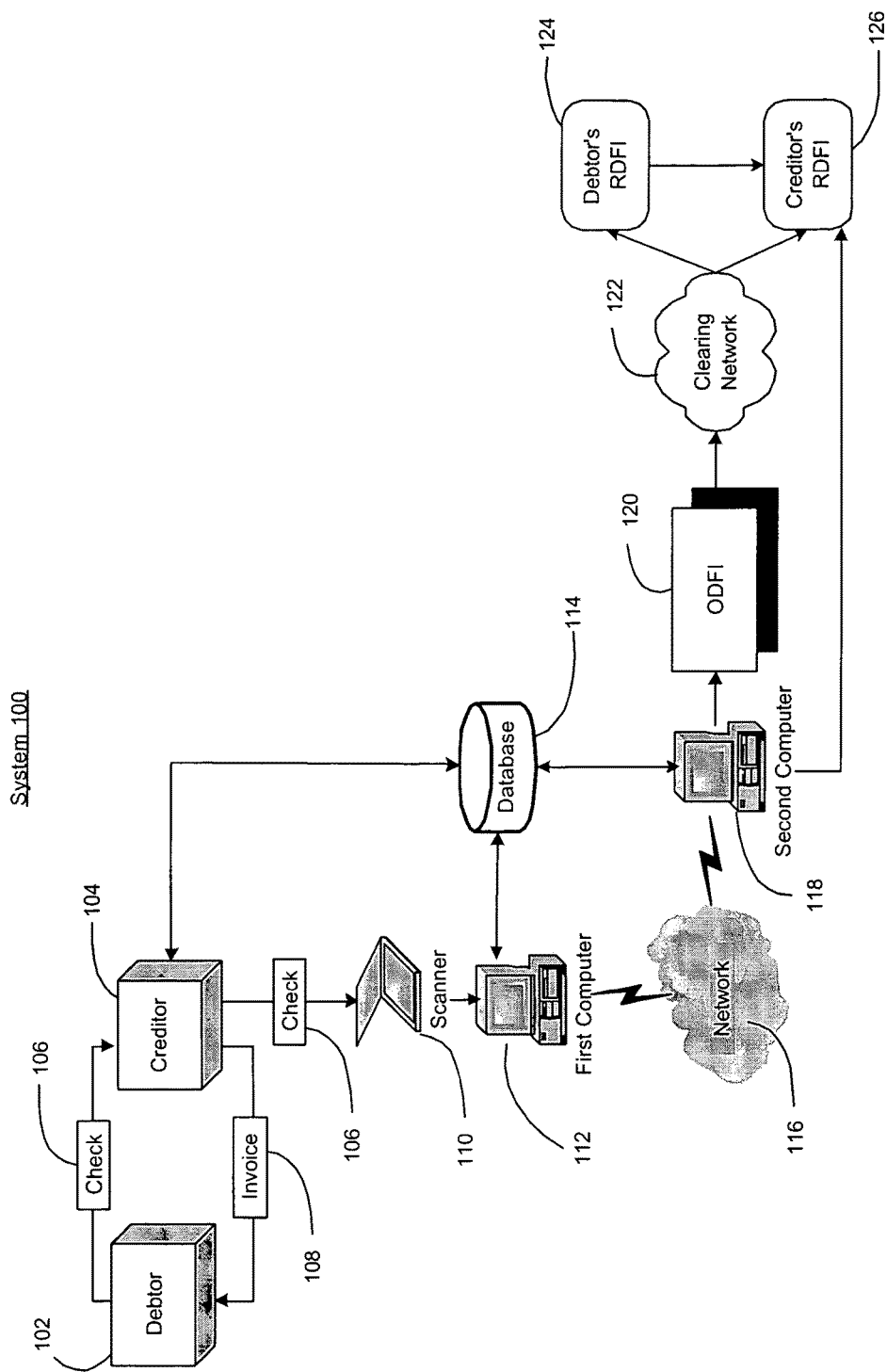
FIG. 1 shows an exemplary system according to the present invention for a single point of entry deposit.

FIG. 1 shows an exemplary embodiment according to the present invention of a system 100 for a single point of entry deposit of financial instruments (e.g., a check, a traveler's check, a money order, etc.). The system 100 may include a creditor 104 (e.g., an individual, an organization, a corporation, etc.) which receives payments in the form of a check 106 from a debtor 102 (e.g., an individual, an organization, a corporation, etc.). Each creditor 104 may have a plurality of debtors 102; information regarding the debtors 102 may be stored in a database 114.

In particular, the database 114 may contain information, such as contact data for the debtors 102 (e.g., names, addresses, phone numbers, etc.), goods and/or services provided, amount owed, financial institution information, or any other data that the creditor 104 may require. In the alternative exemplary embodiment, the database 114 may include a plurality of databases situated in one or more locations; each database may be storing particular type of data and some databases may be storing overlapping data. The database 114 may be accessible by a first computer 112 (e.g., a computing arrangement that has basic input and output devices as well as memory and storage devices). The first computer 112 enables the creditor 104 to perform a variety of computing tasks, such as manage the database 114 and run software applications. The first computer 112 may also be connected to a computer communication network 116 which may be any type of a computing network (e.g., a local area network, a wireless area network, the Internet, etc.). The first computer 112 may be operated by the creditor 104 or a third party responsible for the depositing of checks received by the creditor 104.

Figure 2:
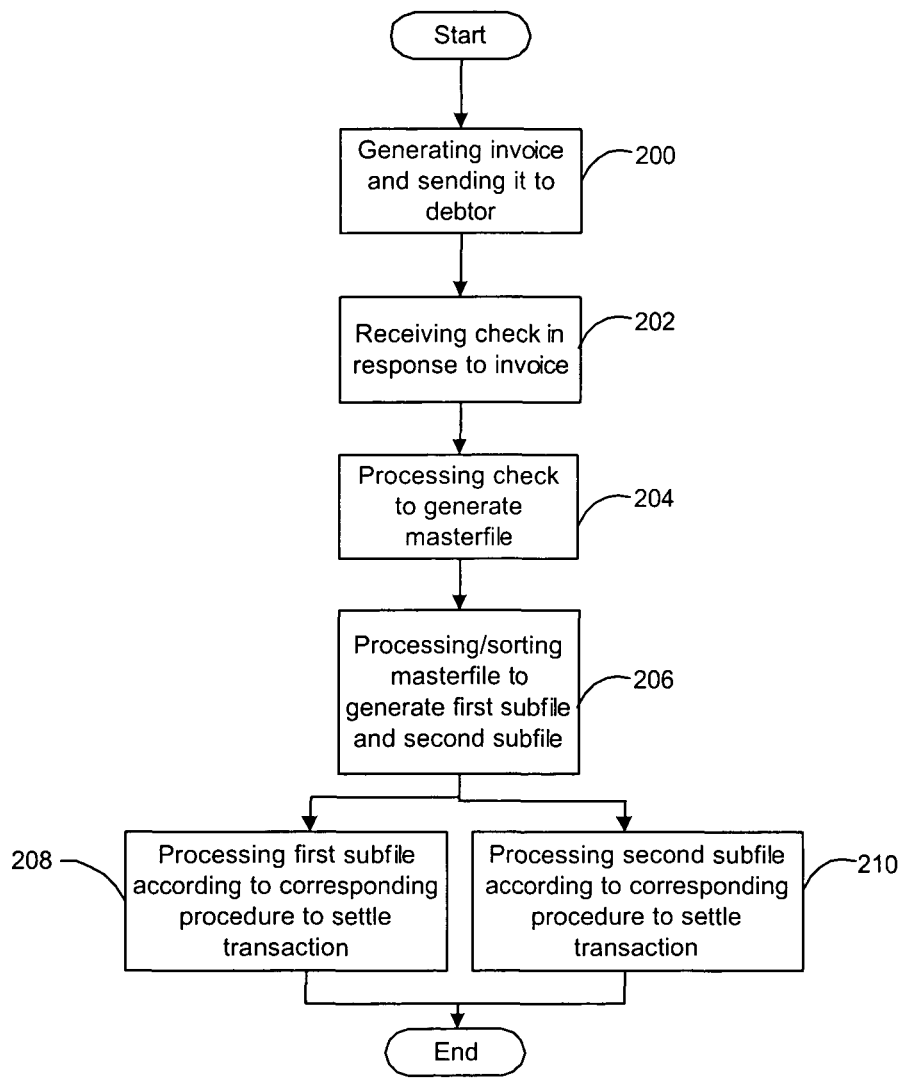
FIG. 2 shows an exemplary method according to the present invention for a single point of entry deposit.

The system 100 is also described in conjunction with FIG. 2 which shows an exemplary embodiment of a method according to the present invention. In step 200, the creditor 104 generates and sends an invoice 108 to the debtor 102. The invoice 108 notifies the debtor 102 that a payment is due for particular goods and/or services provided by the creditor 104 and/or a third party provider. The invoice 108 may be generated based on data entered manually (e.g., by the creditor 104) or obtained automatically (e.g., from the database 114). After the invoice 108 is sent to the debtor 102, the database 114 is updated to reflect the invoice data.

The invoice 108 is only one of a plurality of means of apprising the debtor 102 of the outstanding debt. For instance, the debtor 102 may have a regular business relationship with the creditor 104 in which the creditor 104 supplies the debtor 102 with goods and/or services on a regular basis pursuant to a contract (e.g., monthly, weekly, etc.). In another instance, the debtor 102 has a contractual obligation to pay the creditor 104 on a periodic basis (e.g., monthly) and does not require a separate monthly notice in form of the invoice 108. In an alternative exemplary embodiment of the present invention, the debtor 102 may be a donor which has chosen to send an unsolicited donation to a charity or not-for-profit organization; the unsolicited donation would need to be accompanied by a notification of truncation/conversion of the check 106. Thus, the step 200 of generating an invoice 108 may be optional.

In step 202, the creditor 104 receives a check 106 from the debtor 102 either in response to the invoice 108 or for other purposes some of which were described above. The check 106 may be one of two categories/types: a first type of check drawn on a consumer account (e.g., a personal checking account); or a second type of check drawn on a non-consumer account (e.g., a business checking account, a third-party business account). It should be noted that the accounts of both the debtor 102 and creditor 104 may be at the same or different financial institutions. The process of depositing the checks 106 may depend on the type of check. However, the exemplary embodiment of the present invention allows the creditor 104 to electronically deposit the checks 106, regardless of their type (i.e., consumer or non-consumer checks).

Figure 8:
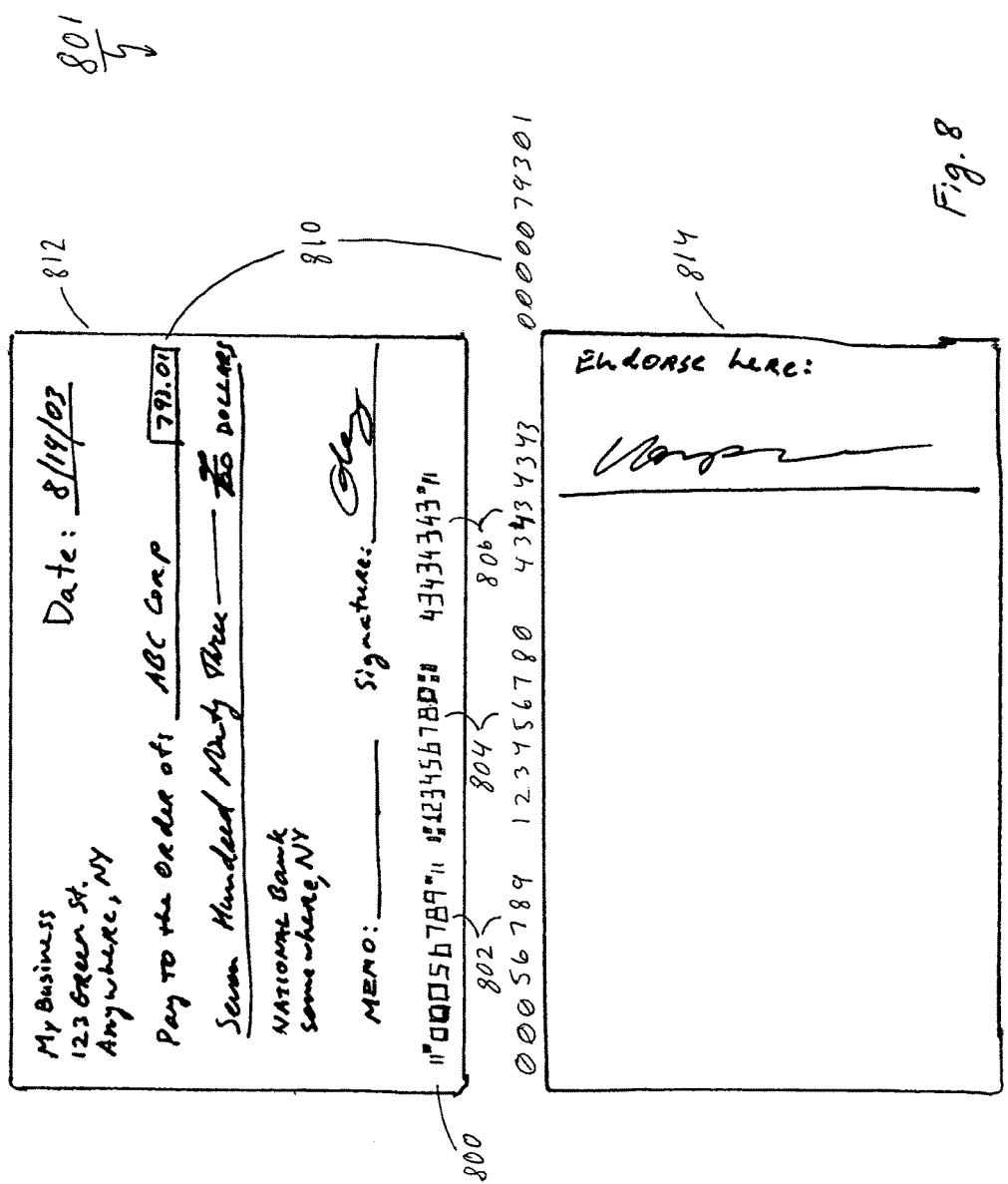
FIG. 8 shows an exemplary embodiment of a digital check record.
Figure 9:
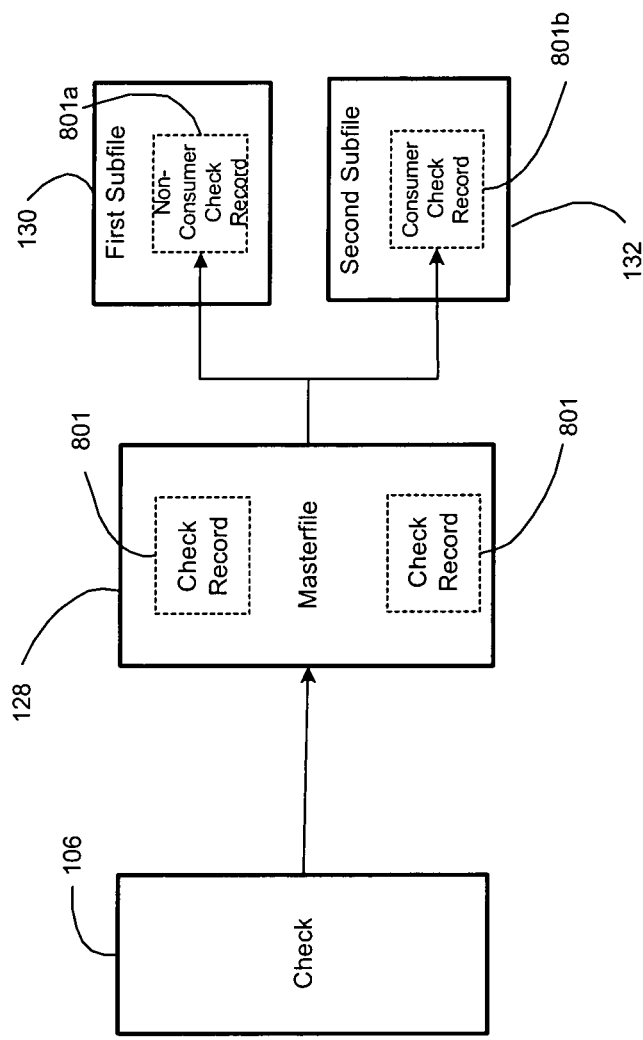
FIG. 9 shows a flow chart diagram of processing checks according to the present invention.

In step 204, the creditor 104 processes the check 106 in order to generate a digital masterfile 128 as shown in FIG. 9. The masterfile 128 contains a record 801 for each of the checks 106. An exemplary record 801 is shown in FIG. 8. The exemplary record 801 is for a non-consumer check. The record 801 may include a digitized image of the check 106 (i.e., a front image 812 and a rear image 814) as well as other check data such as an amount 810, an ABA number 804, an account number 806, a check number 802, and other information (i.e., the date when the check 106 was written or prepared for deposit; data obtained from the MICR line 800). Some of the check data may be obtained from a MICR line 800 as discussed in greater detail below. Those of skill in the art will understand that consumer checks may have the same format or a different format from the exemplary non-consumer check illustrated in FIG. 8.

The record 801 may be obtained by scanning the check 106 using an image capturing device (e.g., a scanner 110). The scanner 110 may be connected as a peripheral device to the first computer 112 or integrated into the first computer 112. Once the checks 106 are scanned through the scanner 110, the first computer 112 captures the MICR line 800, the front image 812 and the rear image 814. Then the first computer (or, in alternative, the second computer 118) parses and analyzes the front image 812 and the rear image 814 as well as the check data (e.g., 802, 804, 806, 810, etc.) collected during the scan and may store it in the masterfile 128. Those skilled in the art would understand that the masterfile 128 may include just a single check or a plurality of checks of either or both types.

As shown in FIG. 9, the masterfile 128 may include check records 801 for multiple checks 106 received by the creditor 104. The processing is accomplished via a specialized software which may be installed on the first computer 112 or may be run remotely via a second computer 118 (e.g., through a web browser). If the specialized software is installed on the first computer 112, then most of the algorithms and logic for processing the checks is resident on the first computer 112. If the specialized software is operated remotely, then the algorithms are performed by the second computer 118. The process of capturing the check data for the masterfile 128 is described in greater detail below.

In step 206, the records 801 of the masterfile 128 are subjected to additional processing to sort each record 801. The masterfile 128 may be processed by the first computer 112 or it may be transmitted for further processing to a second computer 118 through the network 116, depending where the processing software is located. In the exemplary embodiment of FIG. 1, the processing of the masterfile 128 is accomplished by the second computer 118 which may have the same capabilities as the first computer 112 (e.g., connection to the network 116, sufficient storage, etc.). The second computer 118 may also have access to the database 114. The dual computer arrangement shown in FIG. 1 is an exemplary embodiment of the present invention. It is possible to accomplish the steps 204 and 206 by using a single computer (e.g., using only the first computer 112 or the second computer 118) or any number of computers.

If the processing of the masterfile 128 is done on the first computer 112, then the second computer 118 may be only used to connect to the ODFI 120. Those of skill in the art will understand that there may be various computing and networking arrangements used to accomplish the process described with reference to FIG. 2. As described above, the creditor 104 may perform all the steps or it may delegate some or all of the duties of preparing the checks 106 for deposit to a third party (e.g., a data processing entity).

In step 206, the masterfile 128 is processed and sorted in order to separate the non-consumer check records 801a into a first subfile 130 and consumer check records 801b into a second subfile 132 as shown in FIG. 9. According to the present invention, the sorting is done once the records 801 have been created and stored in the masterfile 128, thus, eliminating the need for the creditor 104 to manually sort the non-consumer and consumer checks 106 prior to deposit. If the processing software is installed on the first computer 112, then the first computer generates the first and second subfiles 130 and 132. However, if the processing software is located on the second computer 118, the second computer 118 processes the masterfile 128 to generate the first and second subfiles 130 and 132. The sorting process is described in greater detail below.

After the sorting of the masterfile 128 into the first subfile 130 containing the non-consumer check records 801a and the second subfile 132 containing the consumer check records 801b, the first subfile 130 may be processed pursuant to non-consumer check procedures (e.g., as defined by the U.S. Banking Regulations) as discussed in step 208 and the second subfile 132 may be submitted for processing pursuant to consumer check procedures as discussed in step 210. The first and second subfile 130, 132 are submitted to an Original Deposit Financial Institution ("ODFI") 120 by the second computer 118. It should be noted that the second computer 118 and the ODFI may be owned by the same or separate entities. For example, the ODFI 120 may be a financial institution that is providing the deposit services to the creditor 104. The ODFI 120 may follow specific procedures in depositing the consumer and non-consumer checks.

In step 208, the second computer 118 may process the non-consumer checks by sending the first subfile 130 containing the non-consumer check records 801a directly to the creditor's receiving deposit financial institution ("RDFI") 126 or a third party's RDFI. Alternatively, the RDFI 126 may print the non-consumer check records 801a stored in the first subfile 130 (e.g., create image replacement documents ("IRD")) and manually deposit the IRDs. This process is described in more detail below.

In step 210, the ODFI 120 deposits the consumer checks by transmitting the second subfile 132 to a Clearing Network 122 (e.g., the ACH Network, Federal Reserve Bank, a private clearing house). The clearing Network 122 settles each transaction by debiting the debtor's RDFI 124 for the amount 810 of the check 106 from the debtor's 102 checking account and by crediting the creditor's RDFI 126 by the amount 810 to the creditor's 104 account. Thus, the exemplary system and method alleviates the need for the creditor 104 to manually sort the received checks 106 and facilitates the deposit of the checks by the creditor 104. Those skilled in the art would understand that the second subfile 132 may be processed in accordance with procedures for non-consumer checks as described in the step 208.

Figure 10:
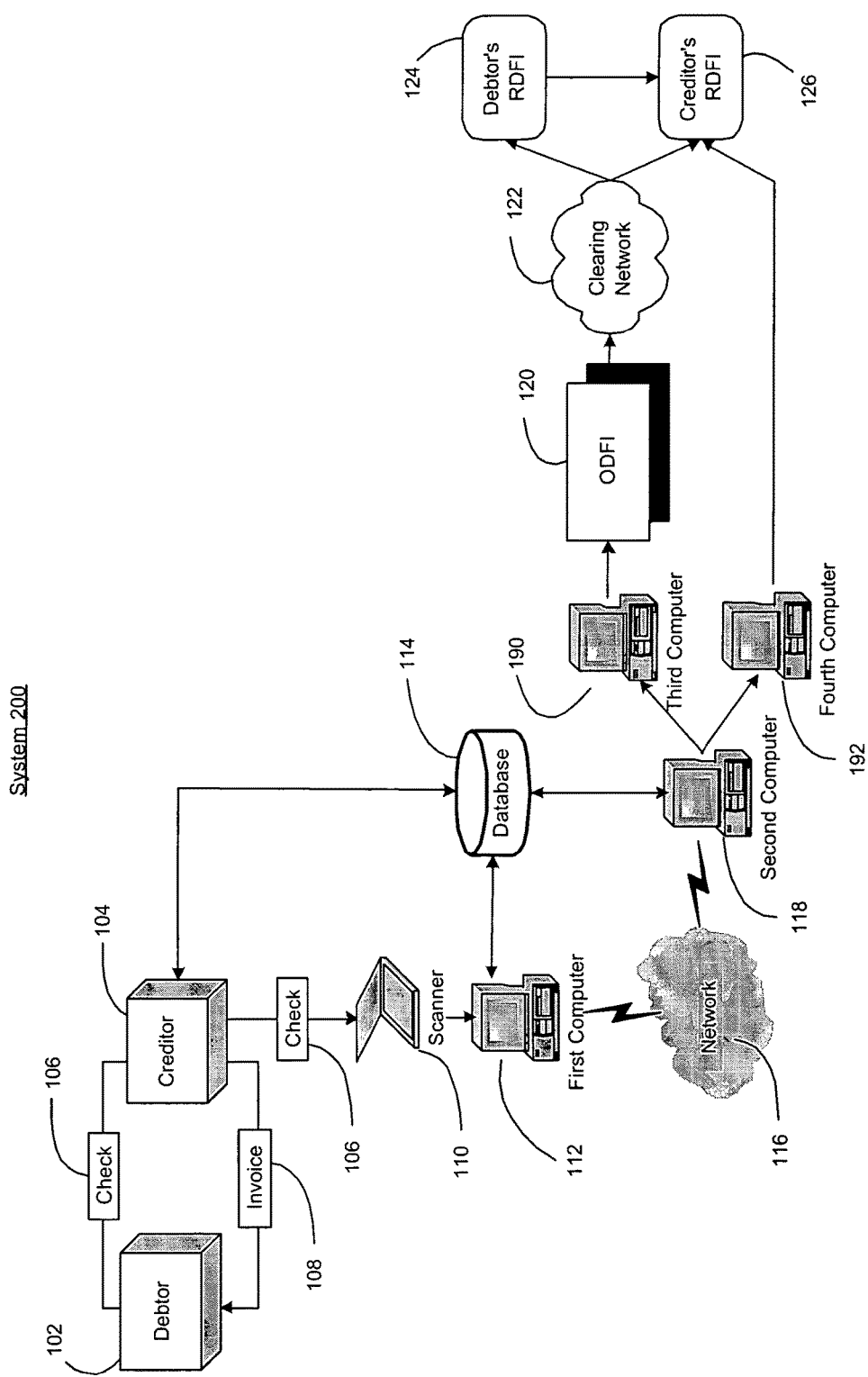
FIG. 10 shows another exemplary embodiment of a system according to the present invention for single point of entry deposit.

FIG. 10 shows another embodiment of a system 200 for single point of entry deposit of checks according to the present invention. The system 200 is substantially similar to the system 100, except it contains a third computer 190 and a fourth computer 192 connected to the second computer 118. The second computer 118 may submit the second subfile 132 to the third computer 190 and the first subfile 130 to the fourth computer 192. The third computer 190 then transmits the consumer check data contained in the second subfile 132 to the ODFI 120. The fourth computer 192 sends the first subfile 130 containing the non-consumer check records 801a directly to the creditor's RDFI 126. Thus, the system 200 accomplishes the same goal as the system 100 in step 208, except that the system 200 uses additional computers. As stated above, the present invention may be implemented using any number of computing devices to facilitate processing and transmission of data associated with the deposit.

Figure 3:
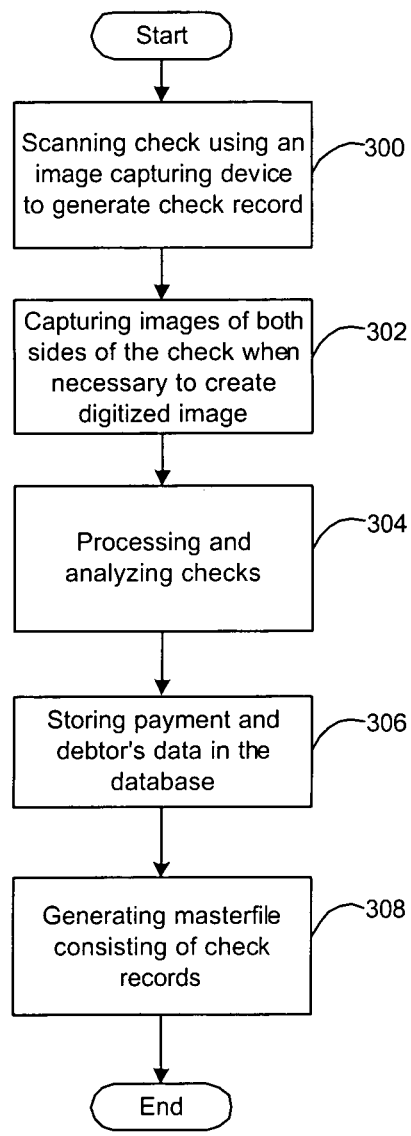
FIG. 3 shows a method for digitizing checks according to the present invention.

FIG. 3 shows a method for processing the check 106 to obtain the record 801 and create the masterfile 128 as discussed with reference to step 204 of FIG. 2. As stated above the record 801 may include the front image 812, the rear image 814, the MICR line 800, as well as the data extracted from the MICR line 800 (e.g., ABA number 804, account number 806, check number 802), the amount 810, and other miscellaneous data (e.g., the date the check was issued). The record 801 may also include data about the debtor 102 (i.e., remaining balance, overdue payment, etc.) extracted from the database 114 if there was a prior dealing between the parties.

In step 300, the creditor 104 scans the check 106 using the scanner 110 or any other type of image capturing device connected to the first computer 112. The scanner 110 may be a high-volume scanner capable of automatically scanning a large number of checks or a less sophisticated model that can scan one or a limited number of checks at a time. It is preferable that the scanner 110 can capture both sides of the check 106 at the same time. However, it is possible for the scanner 110 to be able to scan only one side of the check 106 at a time, in which case the creditor 104 will have to scan the other side of the check 106 when desired.

In step 302, a digitized image of each side of the check 106 is captured to produce the front image 812 and the rear image 814. The front image 812 may contain the date the check 106 was written, the addresses of the debtor 104 and debtor's RDFI 124, and the debtor's signature. The front image 812 also contains the amount 810 and the information concerning the debtor's 102 account encoded in the MICR line 800.

In step 304 the MICR line 800 of the check 106 is processed and analyzed. The MICR line 800 is located at the bottom of the front image 812 and is typed in MICR font. The MICR line 800 may consist of the ABA number 804, the account number 806, the check number 802, and other symbols and/or fields. The standardized printing of the MICR line 800 allows the first computer 112 to recognize the numbers and characters contained therein, using a conventional character recognition software resulting in easy digitization of the data 816. After the MICR line 800 is parsed the data is stored in the record 801 along with the front image 812 and the rear image 814.

The information contained in the MICR line 800 is essential for processing of the check. Every financial institution in the United States has a unique ABA number issued by the Federal Reserve. While a financial institution may have a multitude of ABA numbers, those ABA numbers are only associated with that particular financial institution. The account number is also a unique identification number issued by a financial institution to distinguish between a multitude of account-holders. Furthermore, each check issued from a particular financial institution account may have a check number. A combination of the above-described numbers often makes a check unique, thus allowing the settlement transaction to be carried out at least partially electronically (e.g., without presenting a physical proof of the financial instrument to a financial institution).

In addition to analyzing the MICR line 800, the first computer 112 may also analyze the amount 810 located at the right side of the front image 812. The first computer 112 may use character recognition software to recognize the handwritten amount 810 (or in some cases printed amount 810) and store it in a digital format in the record 801. The character recognition analysis may encounter difficulties in converting the handwritten amount 810, due to the unique nature of each person's writing style. Thus, the character recognition software may have a certain accuracy in determining the amount 810 based on the analysis of the handwriting. Therefore, there may also be a manual final verification of the amount 810. After verification, the amount 810 is also stored in the record 801. Furthermore, the software may also capture other information to include in the record 801 such as the date of the check and the name and address on the check 106.

After the record 801 is created, the first computer 112 may update the database 114 in step 306. The updating step may include reporting of a discrepancy between the amount 810 in the record 801 and the amount expected by the creditor 104, the correlation of the debtor's check number 802 to a particular invoice 108, the verification of the debtor's 102 name and address, etc. In addition, if this is the first check received from a particular debtor 102, the information (e.g., ABA number 804, account number 806, etc.) for the debtor 102 may be added to the database 114.

In step 308, the masterfile 128 is generated. The masterfile 128 includes records 801 of every check 106 processed by the first computer 112. Thus, the masterfile 128 may include a plurality of data files and image files corresponding to each check which are combined into a single file as shown in FIG. 9.

As described with reference to FIG. 2, after the masterfile 128 is created, it is processed to generate the first and second subfiles 130 and 132 (step 206 of FIG. 2). This step may be performed on a single computer (e.g., the first computer 112 or the second computer 118) or a plurality of computers as described above. In this example, the analysis and the sorting process are performed using a sorting software application running on the second computer 118.

Figure 4:
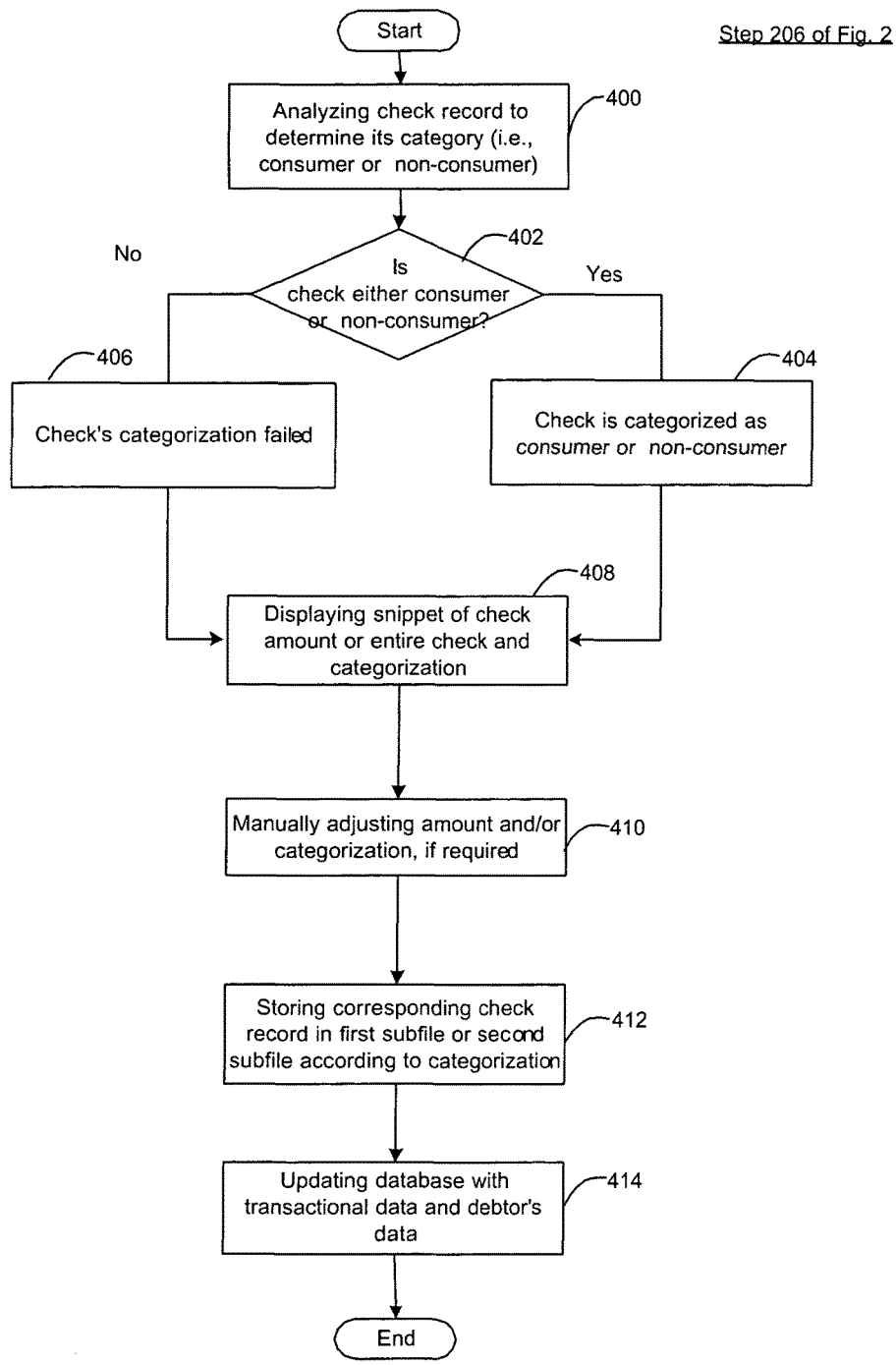
FIG. 4 shows a method according to the present invention for sorting checks into a first subfile and a second subfile based on the check's categories.

FIG. 4 shows an exemplary method for sorting checks 106 as described with reference to step 206 of FIG. 2. In step 400, the sorting software analyzes each record 801 contained in the masterfile 128 to determine its category (i.e., a non-consumer check or a consumer check). This analysis may be accomplished in a number of different manners.

In one example, the sorting software may analyze a format of the MICR line 800. Since each category of check generally uses a different format for the MICR line 800 (i.e., positioning and spacing of the ABA number, the account number, and the check number). As described above, the exemplary check shown in FIG. 8 is the general format of a non-consumer check, i.e., MICR line 800 is formatted having the check number 802 at the far left, followed by the ABA number 804 and the account number 806. For consumer checks (not shown), the format is generally the ABA number located at the far left followed by the account number and the check number. Thus, by reading the format of the MICR line 800, the sorting software may determine whether the check is a consumer check or a non-consumer check.

In another exemplary embodiment of the present invention, the non-consumer check shown in FIG. 8 illustrates the use of special characters surrounding the ABA number 804 and the check number 802. Conversely, for consumer checks, the special characters generally surround the ABA number and the account number. Thus, by reading the special characters, the sorting software may be able to determine whether the check is a consumer check or a non-consumer check. Those of skill in the art will understand that there may be other unique features of consumer checks and/or non-consumer checks that may be used to sort between the two types of checks.

Occasionally, a check may have a differently formatted MICR line that deviates from the accepted norms. As a result, the above-described analyses based on the format of the MICR line 800 may be inconclusive and further analysis may be required. However, even if the sorting software concludes that the check 106 is of a particular type, the sorting software may proceed with the further analysis to verify its own conclusion.

After completing the analysis of the MICR line 800, the sorting software compares the ABA number 804 and the account number 806 with the information stored in the database 114. If the debtor 102 has previously sent a check to the creditor 104 from the same checking account, then a record of that transaction is stored in the database 114. Thus, if there is data of the previous transaction in the database 114, the data will include information as to whether the account was a consumer account or a non-consumer account. The sorting software may search the database 114 for the ABA number 804 and the account number 806 to find a match in the old payment records. If the ABA number 804, the account number 806 of the check 106 match the ABA number and the account number of the previous check, then the check 106 originated from the same account, hence its category is the same. Thus, the sorting software may verify its previous conclusion or come to an initial conclusion based on this checking.

Another example of a sorting method may use the amount of the check. For instance, the sorting software may utilize the amount 810 to find a matching amount in one of the unpaid invoices 108. If such an invoice is found, the information about the debtor 102 is obtained from the database 114 and the check 106 is categorized accordingly. For example, if the amount 810 is for $701.32 and in the database 114 the invoice 108 for $701.32, then there is a match. After the match is found and the information about the debtor 102 is extracted, the sorting software categorizes the check 106 according to the category of the debtor 102. Thus, if the debtor 102 is a non-consumer then check 106 is categorized as a non-consumer check. This categorization method only works in certain situations. For example, there is a possibility that the category of the check may not match the category of the debtor 104 (e.g., a business owner paying with a consumer check). Furthermore, this sorting algorithm only works when there is a single invoice 108 that matches the amount 810. Thus, if there are multiple invoices with that match the amount 810 or none of the invoices match the amount 810, this analysis is inconclusive.

Regardless of whether or not the sorting software provides a definite result, the sorting software may run more sorting algorithms or move to the next step. However, if the sorting software is unable to determine whether the check 106 is consumer or non-consumer, it will conclude its analysis and categorize the check 106 using a default category. The default category may be consumer, non-consumer, or undefined and it may require manual categorization by the user.

In step 402, the sorting software-determines if the check is consumer or non-consumer based on the analysis described above. If the analysis is inconclusive, the categorization has failed, and in step 406, the sorting software does not categorize the check 106.

The sorting software may provide information about the check to the creditor 104 and request or require manual adjustment of the check categorization as discussed below in step 408. If the sorting software was successful in categorizing the check 106, then, in step 404, it stores in the record 801 the corresponding category. Regardless of the categorization, in step 408, the computer displays the results of its analysis on a monitor 500 (e.g., as shown in FIG. 5), other display arrangements or output devices.

The monitor 500 can show every record 801 stored in the masterfile 128. In particular, it can display the following information about the check 106: the account number 806, the ABA number 804, the check number 802 and other data discussed below. This step allows the creditor 104 to verify that the check 106 has been properly digitized. To aid the user in accomplishing that task the display includes a snippet 504. The snippet 504 is a digital image of a portion of the check 106 centered around the amount 810. The display also shows the amount 810 as a digital amount 522. As discussed above, the digitization of the amount 810 may not be precise and thus, the user may modify the digital amount 522 if it is incorrect (i.e., if the digital amount 522 is different from the amount 810 displayed in the snippet 504). The size of the snippet 504 varies with the size of the check so that it displays all of the relevant information. For instance, non-consumer checks are usually larger than consumer checks. Therefore, the snippet 504 may display a larger portion of the check 106 surrounding the amount 810 if desired. Alternatively, the snippet 504 may display the entire check 106 as desired by the user.

The monitor 500 further shows the categorization of the check 106 if the sorting software was able to determine it in steps 400-402. If it is possible to determine the categorization of the check 106, then in step 404 the sorting software selects either a "Consumer" field 508 or a "Non-consumer" field 510. For instance, if the check 106 is a non-consumer check, then the "Non-consumer" field 510 is highlighted. However, if the second computer 118 is not able to categorize the check then it will set the categorization to default (e.g., a non-consumer), allowing the user to select the proper field as explained below in regard to another check record.

Figure 5:
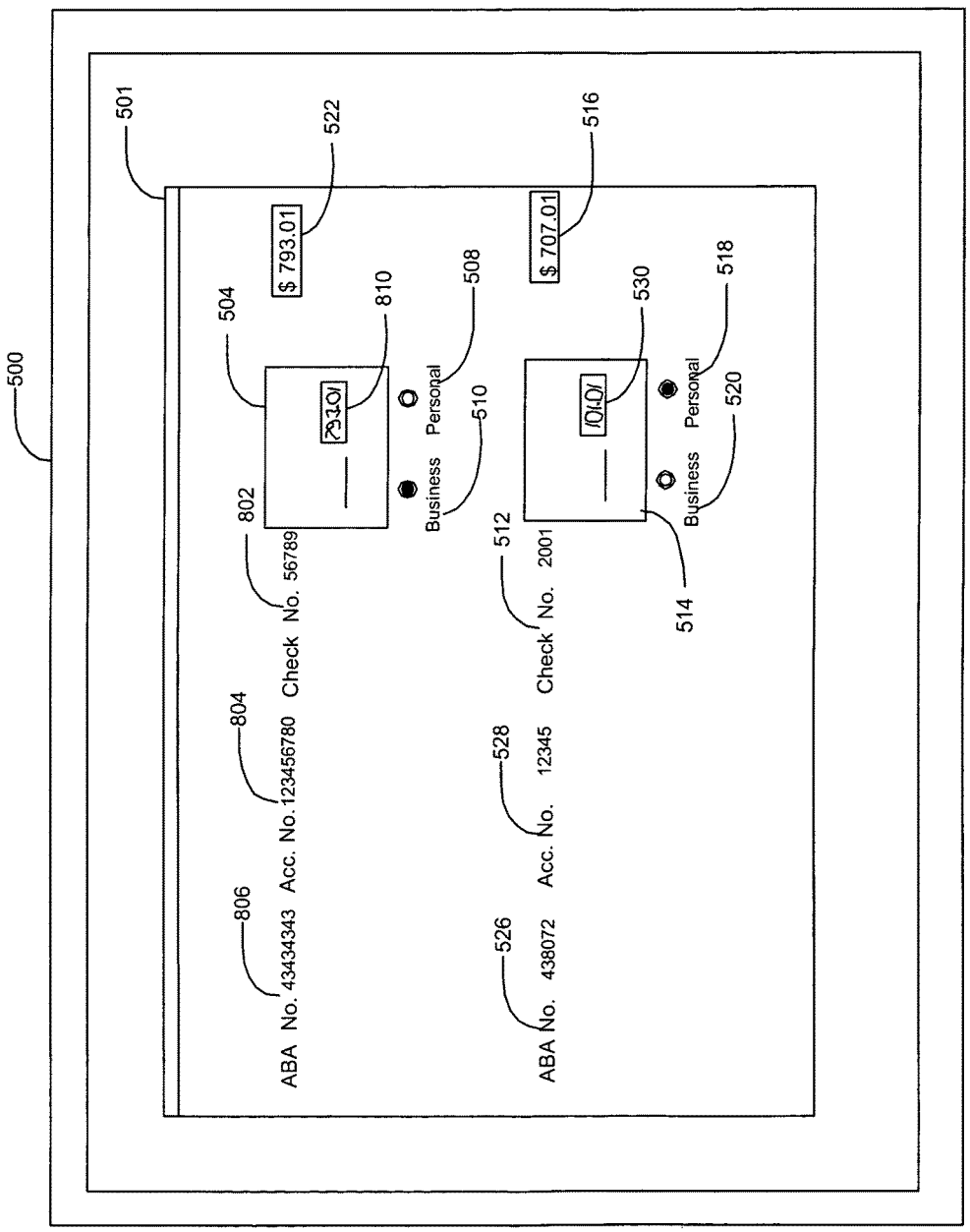
FIG. 5 shows a screenshot of an exemplary embodiment of a software application according to the present invention.

In the example of FIG. 5, the monitor 500 includes a digital check record of a second check which includes an account number 528, an ABA number 526, a check number 512, a snippet 514, and a digital amount 516. In this case, the digital amount 516 is different from an amount 530 being displayed in the snippet 514. In addition, the "Consumer" field 518 is highlighted, since the second computer 118 failed to categorize the check in step 406 and provided that the "Consumer" field 518 is the default category. The user may correct the digital amount 516 by changing it from $ 707.01 to reflect the sum of $ 101.01 shown in the amount 530 (step 410). As discussed above, the user may also manually categorize the check by choosing the check's categorization based on the information supplied by the snippet 514.

After the check 106 is categorized, either by the user or the sorting software, the record 801 is stored in a corresponding subfile, either the first or second subfile 130 or 132 (step 412). The first and second subfiles 130 and 132 are similar to the masterfile 128 since they also contain a collection of records 801. However, the records 801 within either subfile 130 or 132 are of the same category, either non-consumer or consumer. If the check 106 is a non-consumer check, then it is stored in the first subfile 130. However, if the check 106 is issued from a consumer bank account, then it is stored in the second subfile 132. After the first subfile 130 and the second subfile 132 are generated, they are uploaded to the ODFI 120 for a further processing.

In step 414, the database 114 is updated with transactional data (e.g., ABA numbers, account numbers, contact information, etc.). Regular updates maintain the database 114 so that it may be used during categorization of checks in the future as discussed above. For instance, during the amount-matching sorting algorithm, when the sorting software searches the database 114 for invoices 108.

Figure 6:
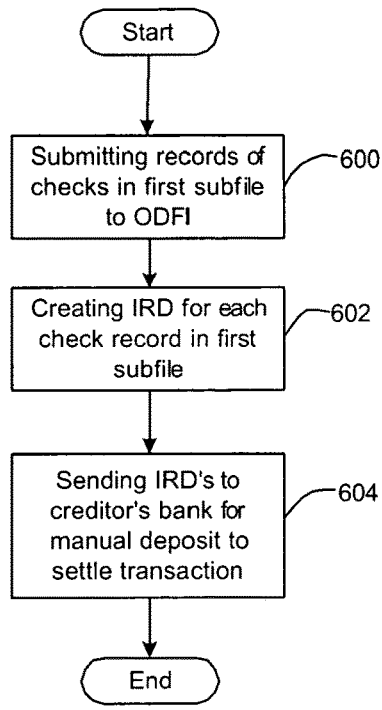
FIG. 6 shows a method for depositing non-consumer check records stored in the first subfile according to the present invention.

FIG. 6 shows an exemplary method according to the present invention for depositing non-consumer check records 801a stored in the first subfile 130. In step 600, the first subfile 130 is sent to the ODFI 120 for processing. As previously described, non-consumer checks may not be entered into the Clearing Network 122. Therefore, in step 602, the ODFI 120 utilize different depositing procedures which may require image replacement documents ("IRD") for each check from its corresponding check record. An IRD is created based on a check record, as shown in FIG. 8. It displays the front side 812 and the rear side 814 and in effect replaces the check 106 (e.g., if the check 106 was issued from a non-consumer account). An IRD also acts as a legal substitute for the original check. In step 604, the ODFI 120 sends the IRD of the check 106 to the creditor's RDFI 126 in order to settle the transaction referenced by the check 106. Thus, the non-consumer checks are deposited in the same manner as if they were brought physically to the financial institution (e.g., creditor's RDFI 126).

Figure 7:
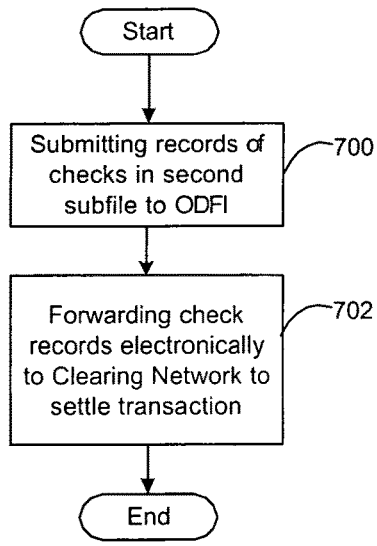
FIG. 7 shows a method for depositing consumer check records stored in the second subfile according to the present invention.

FIG. 7 shows a method for depositing consumer check records stored in the second subfile 132 according to the present invention. In step 700, the ODFI 120 receives the second subfile 132 containing the check records of consumer checks. In step 702 the ODFI 120 forwards the check records from the second subfile 132 to the Clearing Network 122 in order to settle transactions referenced by the checks whose data is stored in the second subfile 132.

The Clearing Network 122 receives the records stored in the second subfile 132. The Clearing Network 122 may verify if the transactions in the second subfile 132 complies with various procedures. For instance, the Clearing Network 122 may check for duplicate entries; amount of a check, the number of times a particular check has been presented, etc. Subsequently, the Clearing Network 122 debits the debtor's RDFI 124 to deduct the amount 810 from the account of the debtor 102 and that amount is credited to the account of the creditor 104 by the creditor's RDFI 126. As stated above, the second subfile 132 may be processed utilizing procedures for the first subfile 130.

The present invention provides a single point of entry deposit for all checks, regardless if they are issued from consumer or non-consumer accounts. The creditor does not need to segregate the non-consumer checks and consumer checks and later take the non-consumer checks to its own financial institution for manual deposit. The creditor scans all the checks using the computer arrangement discussed above. After that initial step, the process is performed by various computers. The computers first digitize the checks and then sort the digital check records. Thus, the present system automates a previously time consuming activity: manual sorting of checks and the subsequent deposit of checks.

The system according to the present invention may be deployed on any number of computing devices. The exemplary embodiment discussed above included a dual-computer arrangement where the first computer generated the masterfile, which was later processed by the second computer. However, the entire system may be executed using a single computer. For instance, the creditor's computer (e.g., the first computer) may have all of the software installed that is necessary to generate and process the masterfile.

Alternatively, the second computer may control the entire process. In that situation, the first computer would simply serve as a remote terminal that would only allow the creditor to scan in the checks and would also display the sorting results for manual verification (e.g., using an applet 501 shown in FIG. 5). The second computer would control the scanner and all the other processes (e.g., the sorting process, settlement process, etc.). This embodiment diminishes a security risk that is associated with the other embodiments, namely susceptibility to manipulation through unauthorized access (i.e., by creditor) of the software installed on the first computer. As stated above the software application(s) are installed on the second computer, which may be located at a remote location (e.g., a data processing entity) where access to the software application(s) to third parties is limited. Thus, by utilizing the second computer, there is a decreased chance that the creditor or a third party can manipulate the electronic deposit process (e.g., forgery).

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A remote check deposit method by which is deposited a plurality of checks including both a consumer check and a non-consumer check each comprising a Magnetic Ink Character Recognition (MICR) line, each MICR line having a format, without manual sorting of the non-consumer checks and the consumer checks prior to deposit, comprising:

scanning, into a single point of entry, the checks including the consumer check and the non-consumer check, wherein the single point of entry into which the checks are received is a scanner with a computer; followed by electronically depositing both the consumer check and the non-consumer check, provided that no manual sorting of consumer checks from non-consumer checks has been performed before deposit wherein the remote deposit method comprises:

after a check has been scanned into an image capturing device which is the single point of entry, and processed into a check record, and before electronically forwarding the check record of the check for electronic deposit: format-analyzing, by a processor, the format of the MICR line, and categorizing the check as a consumer check or a non-consumer check based on position of data on the MICR line, wherein the categorizing is performed by a processor; and wherein the format-analyzing of the MICR line comprises analyzing for whether the MICR line format (1) has check number located at far left followed by ABA number and account number: or (2) has ABA number located at far left followed by account number and check number;

electronically forwarding the check records for deposit, whereby the plurality of checks including the consumer check and the non-consumer check are deposited;

wherein the method comprises steps performed by a computer of:

analyzing the check record to categorize as consumer or non-consumer; categorizing the analyzed check record as consumer or non-consumer; displaying a snippet of check amount or an entire check and a categorization.

2. The method of claim 1, comprising processing the plurality of checks into a first sub-file that includes only non-consumer checks and a second sub-file that includes only consumer checks;

processing and forwarding the second sub-file that contains only the consumer checks to a clearing network for a settlement; and electronically submitting the first sub-file that includes only the non-consumer checks to a financial institution.

3. The method of claim 1, wherein the scanner in the scanning step scans one check at a time, and is otherwise than a high-volume scanner.

4. The method of claim 1, wherein the scanner in the scanning step scans a limited number of checks at a time, and is otherwise than a high-volume scanner.

* * * * *